May 30, 1933.   B. E. LENEHAN   1,911,372
REMOTE INDICATING SYSTEM
Filed Nov. 5, 1930
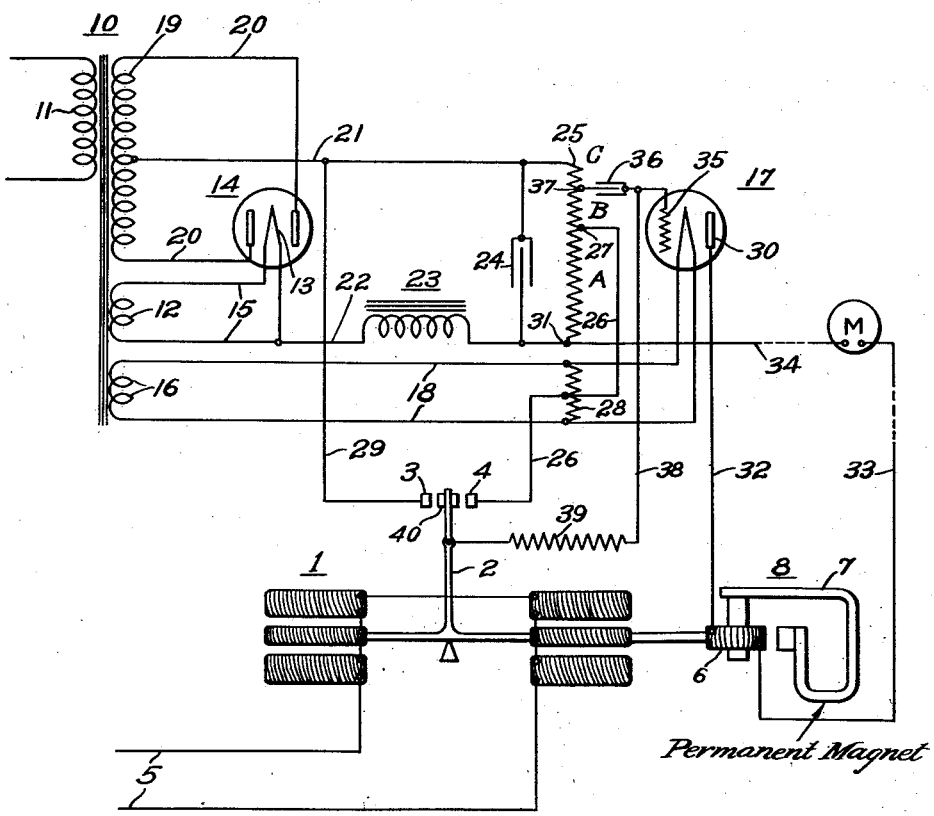
INVENTOR
*Bernard E. Lenehan.*
BY
ATTORNEY Patented May 30, 1933

1,911,372

UNITED STATES PATENT OFFICE

BERNARD E. LENEHAN, OF BLOOMFIELD, NEW JERSEY, ASSIGNOR TO WESTINGHOUSE ELECTRIC & MANUFACTURING COMPANY, A CORPORATION OF PENNSYLVANIA

REMOTE INDICATING SYSTEM

Application filed November 5, 1930. Serial No. 493,569.

My invention relates to measuring devices, and it has particular relation to the electrical transmission of indications from a measuring instrument to a remote indicator.

The problem of remote indication of measured quantities is especially important in the modern complex electrical network. In order to permit the network operator to readily and rapidly determine conditions of the various component parts of the network, it is the modern practice to transmit electrical and mechanical measurements from each component to a central station by some system of remote metering.

Heretofore, the systems of remote metering entailed the use of a large number of mechanical moving parts. Such parts are objectionable because of errors due to wear, sluggishness, delicacy, and prevalence of mechanical derangement.

The systems disclosed in the prior art have also been subject to errors caused by changes in the electrical conditions of the network to be measured. Inaccuracy of indications is, of course, undesirable.

It is, accordingly, an object of my invention to provide a system for remote indication which is free from error.

Another object of my invention is to provide a system for remote indication which has few moving parts.

More specifically stated, it is an object of my invention to provide a system for remote indication which may be energized from any convenient source of energy without being affected by variations in the source.

Other objects of my invention will become evident from the following detailed description, taken in conjunction with the single figure of the accompanying drawing, which is a schematic illustration of the apparatus and circuits which may be employed in the practice of my invention.

According to my invention, I energize a thermionic tube from a potentiometer which is supplied with power from any convenient energy source. The grid potential of the tube is varied in accordance with the quantity to be measured, and the plate current is transmitted to a remote indicator.

Referring to the drawing, the system comprises a measuring element 1, upon which an electrical quantity to be measured is impressed. The element shown, which is of the Kelvin balance type commonly employed in the "current balance" system of remote metering, has a pivoted member 2 adapted to engage either of two contact members 3 and 4.

An electrical current, corresponding to the quantity to be measured, is impressed upon the windings of the element 1 through conductors 5, and generates a torque which tends to rotate the member 2 in a predetermined direction.

An opposing torque is applied to the member 2 to resist rotation thereof. This opposing torque may be introduced by a direct-current coil 6 carried by the member 2, and adapted to move with reference to the pole shoes of a permanent magnet 7. The moving coil 6 and the magnet 7 constitute what is generally known as a balancing element 8.

In order to obtain a remote indication of the quantity to be measured, I pass a direct current through a series circuit, including the coil 6 and a remote indicator M, of such magnitude that the torque generated in the balancing element 8 suffices to balance the torque of the element 1. The magnitude of this direct current, as recorded by the indicator M, then serves as an indication of the quantity to be measured.

The torques of the elements 1 and 8 must be balanced automatically in practice. It is also desirable to obtain the direct current supply from an alternating current network.

To secure these desiderata, I provide any suitable rectifier such as that depicted in the drawing, which includes a transformer 10 having a primary winding 11 connected to an alternating-current source or network, and having a plurality of secondary windings. One secondary winding 12 supplies alternating current to the filament 13 of a rectifier tube 14 through conductors 15, a second winding 16 supplies alternating current to the filament of a thermionic tube 17 through conductors 18; and a third winding 19 supplies alternating current to the plates of the full wave rectifier tube 14 through conductors 20.

The direct-current output of the rectifier tube 14 passes by way of conductors 21 and 22 through any suitable filtering device, here represented by a choke coil 23 and a condenser 24, to a potentiometer 25.

A conductor 26 connects an intermediate tap 27 of the potentiometer 25 to the midpoint of a potentiometer 28 placed across the filament conductors 18, and to the contact member 4. The contact member 3 is connected by conductors 29 and 21 to the negative side of the potentiometer 25.

Plate potential for the tube 17 is supplied by a section A of the potentiometer 25. The plate 30 is connected in series circuit relation with the coil 6, the indicator M and the positive tap 31 of the section A by means of conductors 32, 33, and 34.

The potential of the grid 35 with respect to the filament of the tube 17 is determined, in part, by a condenser 36 inserted between the grid and a tap 37 on the potentiometer. The grid side of the condenser is connected by means of a conductor 38 and a resistance 39 to a contact member 40 on the member 2.

The operation of the above-described apparatus may be set forth as follows: An electrical current representing the quantity to be measured, such as power, current, speed, voltage, etc., is applied through conductors 5 to the element 1, and tends to rotate the member 2 until contacts 4 and 40 engage. This contact engagement connects the condenser 36 across a section B of the potentiometer 25, but the condenser charges comparatively slowly because of the large resistance 39 in series with it.

The condenser charge is of a polarity to decrease the negative potential of the grid 35 with respect to the filament of the tube 17. The decrease in negative grid potential results in an increase of the plate current of the tube 17, thereby increasing the tendency of the winding 6 (through which the plate current passes) to move the member 2 and separate the contact members 4 and 40.

The plate current increases until the torque which is generated in the element 8 moves the member 2 against the opposing torque of the element 2, thereby separating contacts 4 and 40. Since the separation of the contacts disconnects the charging circuit from the condenser 36, the bias on the grid 35 thereafter remains constant.

The indicator M now registers a current bearing a predetermined ratio to the quantity measured, as determined by the proportions of the elements 1 and 8.

If the quantity measured decreases in magnitude, the torque of the element 1 decreases and the resultant torque moves the member 2 until contacts 3 and 40 engage. This places a section C of the potentiometer 25 across the condenser 36 in series with the resistance 39, and slowly increases the negative potential of the grid 35 with respect to the filament as the condenser charges, thereby decreasing the plate current and the torque produced by the element 8. When the plate current has decreased sufficiently, the torque of the element 1 forces the contacts 3 and 40 apart, against the decreased torque of the element 8. The plate current attains its predetermined ratio to the quantity measured, and the indicator serves, therefore, to register the reduced quantity.

Consequently, the circuit automatically maintains a predetermined ratio between the quantity to be measured and the direct current passing through the indicator M; the ratio being such that the torques on the member 2 are balanced. The indicator reading, therefore, varies in accordance with the quantity to be measured.

The rate of charge of the condenser 36 is determined by the value of the resistance of the circuit including the condenser. The resistance 39 is designed to limit this rate in order to permit sufficient time for the member 2 to return the contact member 40 to its neutral position without overshooting, when the torques of the elements 1 and 8 become balanced.

Systems known to the prior art were subject to errors caused by variations in the direct current supply source, these errors appearing at the indicator as dips or crests in the indicator record. In order to prevent a variation in the power supply from affecting the indications of the system, I prefer to so relate the sections A and B of the potentiometer 25 that a change in voltage applied to the potentiometer does not alter the performance of the tube 17. That is, I so proportion the potentiometer 25 that the ratio of the potential drop across the section A to that across the section B is of the order of the amplification factor of the tube 17.

Therefore, while a decrease in the voltage across the potentiometer is accompanied by a decrease in the plate voltage determined by the section A, the grid potential, determined in part by section B, automatically changes by an amount sufficient to maintain an unaltered plate current through the tube 17. This provision insures continuous accuracy of the transmitted measurement regardless of variations in the electrical relations of the network supplying power to the tube 17.

In representing a large amount of power by a small current, a slight deviation in the current may represent a large increment of power. My invention has only one mechanically moving part, and is extremely simple and compact. Although I require an external source of energy, the accuracy of my system is not affected by variations of the electrical network. My system is, therefore, not only extremely accurate, but, because of the absence of mechanically moving parts, it will remain accurate.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In a system for measuring a quantity, an energy storage device, a source of energy, means for connecting the device to the source when the energy stored therein departs from a value corresponding to the magnitude of the quantity, said means being adapted to disconnect the device when the stored energy reaches the value, and means including a thermionic device controlled by the amount of energy stored in the device for making an indication of the quantity measured.

2. In a system for measuring a quantity, in combination with an indicator, means for producing a torque varying in magnitude with the quantity, and means for producing a counter torque varying in magnitude with the indicator reading, of means for storing energy, and means including an electronic-discharge device responsive to the amount of stored energy for balancing said two torques.

3. In a system for measuring a quantity, an indicator for indicating the magnitude of the quantity, means including a condenser and a thermionic device controlled by the condenser for controlling the reading of the indicator by varying the energizing current of the indicator and means for varying the charge on the condenser when the indicator fails to record the correct magnitude, whereby the indicator reading is corrected.

4. In a system for measuring a quantity, a vacuum tube including a plate, grid, and cathode, a condenser in series with the grid and cathode, means for supplying energy to the tube, means responsive to the departure of the plate current from a predetermined relation to the quantity for varying the charge on the condenser, whereby the plate current is brought to the predetermined relation, and means for indicating the magnitude of the plate current.

5. In a system for measuring a quantity, an indicator for indicating the magnitude of the quantity, a condenser and a vacuum tube for controlling the reading of the indicator, means for varying the charge on the condenser when the indicator fails to indicate the correct magnitude whereby the indicator reading is corrected, and means for limiting the rate of variation of charge.

6. In a remote metering system, a vacuum tube including a plate, grid and cathode, a condenser in series with the grid and cathode, means for supplying energy to the tube, means responsive to the departure of the plate current from a predetermined relation to the quantity being measured for varying the charge on the condenser, whereby the plate current is brought to the predetermined relation, means for limiting the rate of variation of charge, and means for indicating at a remote point the magnitude of the plate current.

7. In a measuring system, a controlled circuit, a control circuit, said circuits being so related that a voltage applied to the control circuit produces the same effect in the controlled circuit as a voltage applied to the controlled circuit equal to the control circuit voltage multiplied by a predetermined factor, an energy source, means for applying voltages from the source to said circuits of such value that the ratio of the voltage applied to the controlled circuit to that applied to the control circuit is of the order of said factor, said means being so related to the source that a variation in the source produces proportional variation in said voltage, means for introducing in the control circuit a voltage varying in accordance with a quantity to be measured, and means in said controlled circuit for indicating the quantity.

8. In a system for measuring a quantity, an energy source, a tube including a grid, a cathode, and plate, means energized from said source for applying a plate to cathode voltage, means energized from said source for applying a grid to cathode voltage, the ratio of the first-named voltage to the second-mentioned voltage being of the order of the amplification factor of the tube, means for adding a voltage varying in accordance with the quantity to the grid to cathode voltage, and means for indicating the magnitude of the plate current.

9. In a remote metering system, in combination, an electrical measuring device responsive to the quantity to be indicated, an indicating device for indicatitng the said quantity, a circuit for energizing the indicating device, and means including a thermionic tube and a condenser associated with the grid of the tube for controlling the current in said circuit in accordance with the operation of the measuring device.

10. In a system for measuring an electrical quantity of a circuit comprising, in combination, an indicating device, a circuit including the indicating device, a direct-current source for energizing the circuit, a vacuum tube disposed to control the current flowing in the circuit, and means including a measuring device responsive to the electrical quantity being measured for controlling the functioning of the vacuum tube, whereby the current flowing through the indicating device is caused to vary in accordance with the electrical quantity being measured.

11. A remote metering system comprising a Kelvin balance having a direct-current balancing element for measuring an electrical quantity of a circuit, an indicating device, a direct-current energizing circuit connecting the indicating device and the balancing element in series, a vacuum tube disposed to control the flow of direct current in the energizing circuit for the indicating device, means for energizing the tube, and means responsive to the Kelvin balance for varying the grid voltage of the tube in accordance with variations of the quantity being measured, thereby to vary the plate current flowing in the circuit of the indicating device and balancing element.

12. In a remote metering system, in combination, an indicating device, a vacuum tube having a plate, grid and cathode for controlling the indicating device, said indicating device being connected in series-circuit relation with the plate and cathode of the tube across a suitable voltage source, a condenser associated with the grid to cathode circuit of the tube to control the grid voltage of the tube, and a measuring device responsive to the magnitude of the quantity to be indicated for varying the charge on the condenser to effect a variation in the grid voltage of the tube and the plate current in accordance with the magnitude of the quantity.

13. A system for operating an indicating device comprising a measuring device responsive to the magnitude of a quantity or characteristic to be indicated, a vacuum tube disposed to control the indicating device through its plate circuit, a source of energy for energizing the filament of the tube, a source of voltage for the grid circuit of the tube, a condenser connected in said grid circuit, and means controlled by the measuring device for varying the charge on the condenser to vary the grid voltage of the tube, thereby to control the plate current of the tube in accordance with the magnitude of the quantity or characteristic being measured.

In testimony whereof, I have hereunto subscribed my name this 29th day of October 1930.

BERNARD E. LENEHAN.